(12) United States Patent
Reid et al.

(10) Patent No.: US 11,022,194 B2
(45) Date of Patent: Jun. 1, 2021

(54) ADJUSTABLE DAMPER IN ANGLE OF ATTACK SENSORS

(71) Applicant: Rosemount Aerospace Inc., Burnsville, MN (US)

(72) Inventors: Alexander N. Reid, St. Louis Park, MN (US); Richard Alan Schwartz, Faribault, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 148 days.

(21) Appl. No.: 15/983,717

(22) Filed: May 18, 2018

(65) Prior Publication Data

US 2019/0353223 A1    Nov. 21, 2019

(51) Int. Cl.
*F16F 9/56*     (2006.01)
*F16F 13/00*    (2006.01)

(52) U.S. Cl.
CPC .............. *F16F 9/56* (2013.01); *F16F 13/007* (2013.01); *F16F 2230/0005* (2013.01); *F16F 2230/0041* (2013.01); *F16F 2230/18* (2013.01)

(58) Field of Classification Search
CPC ........ F16F 9/56; F16F 13/007; F16F 2230/18; F16F 2230/0041; F16F 2230/005; G01M 3/40; G01P 5/16; G01P 13/025; G01N 27/06
USPC ......... 188/300; 267/64.11, 64.13; 73/170.01, 73/170.03–170.09, 861.77
See application file for complete search history.

(56) References Cited

U.S. PATENT DOCUMENTS

| | | | |
|---|---|---|---|
| 3,534,600 A * | 10/1970 | Wagenknecht | G01P 5/16 73/180 |
| 3,882,721 A | 5/1975 | Neary et al. | |
| 4,901,566 A | 2/1990 | Boetsch et al. | |
| 5,400,878 A | 3/1995 | D'Anna et al. | |
| 6,612,166 B2 | 9/2003 | Golly et al. | |
| 6,941,805 B2 | 9/2005 | Seidel et al. | |
| 9,702,783 B2 * | 7/2017 | DeAngelo | G01M 3/40 |

FOREIGN PATENT DOCUMENTS

| | | | |
|---|---|---|---|
| GB | 1319863 A1 * | 6/2003 | |
| JP | S6367437 A | 3/1988 | |
| WO | WO0177622 A3 | 10/2001 | |

OTHER PUBLICATIONS

Extended European Search Report for European Patent Application No. 19174812.8, dated Oct. 23, 2019, 7 pages.

* cited by examiner

*Primary Examiner* — Pamela Rodriguez
(74) *Attorney, Agent, or Firm* — Kinney & Lange, P.A.

(57) ABSTRACT

A damper assembly for an angle of attack sensor includes a rotor including a conical portion, a damper housing in which the rotor is positioned, the damper housing being configured to be adjusted axially with respect to the rotor and including a tapered interior surface that matches a profile of the conical portion, and a locking mechanism adjacent the damper housing.

18 Claims, 3 Drawing Sheets

ADJUSTABLE DAMPER IN ANGLE OF ATTACK SENSORS

BACKGROUND

The present disclosure relates to sensors, and in particular, to angle of attack sensors.

Angle of attack sensors with rotatable vanes are installed on the exterior of an aircraft to measure the aircraft angle of attack, the angle between oncoming airflow and the aircraft zero line (a reference line of the aircraft, such as a chord of a wing of the aircraft). The angle of attack sensor is mounted to the aircraft such that the rotatable vane protrudes outside the aircraft and is exposed to oncoming airflow. Aerodynamic forces acting on the rotatable vane cause the vane to align with the direction of the oncoming airflow. Rotational position of the vane is sensed and used to determine the aircraft angle of attack.

Dampers are utilized in angle of attack sensors to assist with proper functioning of the angle of attack sensor. Tolerances among components within the damper result in implicit variation among dampers. Such variation results in variations in the angle of attack sensor's dynamic response, or the vane's response to the removal of deflecting forces.

SUMMARY

A damper assembly for an angle of attack sensor includes a rotor including a conical portion, a damper housing in which the rotor is positioned, the damper housing being configured to be adjusted axially with respect to the rotor and including a tapered interior surface that matches a profile of the conical portion, and a locking mechanism adjacent the damper housing.

A damper assembly for an angle of attack sensor includes a shaft, a body surrounding the shaft and including exterior threading on an exterior surface of the body, a damper housing including interior housing threading engageable with the exterior threading of the body and a tapered interior surface, and a rotor connected to an end of the shaft and located between the body and the tapered interior surface of the damper housing, the rotor including a conical portion adjacent the tapered interior surface of the damper housing.

A method of adjusting a damper assembly of an angle of attack sensor includes moving a damper housing axially with respect to a rotor to adjust a width of a gap between the damper housing and the rotor of a damper assembly and fixing the damper housing with respect to the rotor using a locking mechanism.

DETAILED DESCRIPTION

In general, the present disclosure describes an angle of attack sensor that has a damper assembly including a rotor having a conical portion and a damper housing having a tapered interior surface matching the profile of the conical portion, the damper housing being movable with respect to the rotor to adjust the gap between the rotor and the damper housing. The damper assembly also includes a locking mechanism to fix the damper housing with respect to the rotor once the desired gap width is achieved. As a result, the damper assembly can be adjusted to account for implicit variation that results from mechanical tolerances and tolerance in damper fluid viscosity, or to change the dynamic performance characteristics of the damper.

Figure 1:
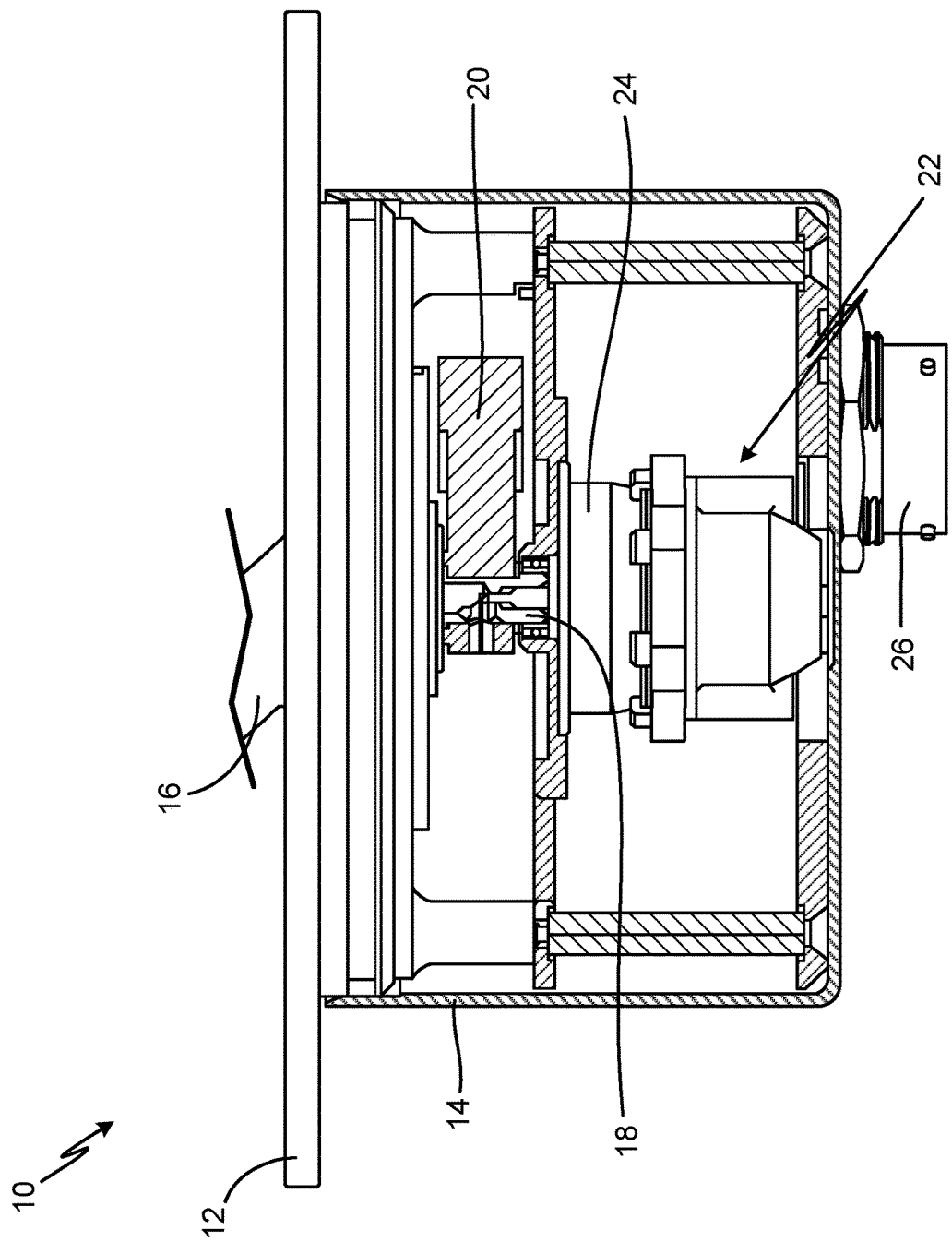
FIG. 1 is a partial cross-sectional view of an angle of attack sensor.

FIG. 1 is a partial cross-sectional view of angle of attack sensor 10. Angle of attack sensor 10 includes faceplate 12, housing 14, vane 16, vane shaft 18, counterweight 20, damper assembly 22, which includes sensor 24, and connector 26.

Faceplate 12 of angle of attack sensor 10 is about flush with the surface, or skin, of an aircraft when angle of attack sensor 10 is installed on an aircraft. Faceplate 12 is positioned on housing 14. Housing 14 is cylindrical with an annular sidewall between an open first end and a closed second end. Faceplate 12 is positioned on the open first end of housing 14. Vane 16 is rotatable and extends through faceplate 12 into external airflow. Vane 16 may be wedge-shaped, airfoil-shaped, or any other suitable shape. Vane 16 is part of a vane assembly attached to vane shaft 18. A first end of vane shaft 18 is connected to vane 16. Vane shaft 18 extends into housing 14. Counterweight 20 is mounted on vane shaft 18 within housing 14. As such, vane 16, vane shaft 18, and counterweight 20 are configured to rotate together. A second end of vane shaft 18 is connected to damper assembly 22. In this embodiment, damper assembly 22 is aligned with vane shaft 18, or the center axis of rotation of vane 16. In alternate embodiments, damper assembly 22 may be offset from vane shaft 18. Damper assembly 22 is a mechanical damper. In this embodiment, damper assembly 22 includes sensor 24 aligned with vane shaft 18. Vane shaft 18 is coupled to sensor 24. Sensor 24 may be a resolver, an RVDT, or any other suitable sensor. Sensor 24 is electrically connected to connector 26 via wiring (not shown). Connector 26 is connected to a flight computer (not shown).

Angle of attack sensor 10 is installed on the exterior of an aircraft and mounted to the aircraft via fasteners, such as screws or bolts, and mounting holes on faceplate 12. As a result, an exterior surface of faceplate 12 is about flush or just below flush with the skin of the aircraft, and housing 14 extends within an interior of the aircraft. Vane 16 extends out from the exterior of the aircraft and is exposed to oncoming airflow, causing vane 16 to rotate with respect to faceplate 12 via a series of bearings within angle of attack sensor 10. Vane 16 rotates based on the angle the aircraft is flying at relative to the oncoming airflow. More specifically, vane 16 rotates to be parallel with oncoming airflow. Vane 16 causes rotation of vane shaft 18, which is coupled to sensor 24 to measure the local angle of attack or angle of the airflow relative to the fixed aircraft structure. Counterweight 20 is mounted on vane shaft 18 to counterbalance vane 16. Damper assembly 22 controls how vane 16 responds to oncoming airflow. Damper assembly 22 minimizes oscillation of vane 16 that can result from an impulse load or impulse deflection to vane 16, thus providing damping to angle of attack sensor 10. Connector 26 communicates the angle of attack measurement to a flight computer so that angle of attack measurements may be utilized.

Figure 2:
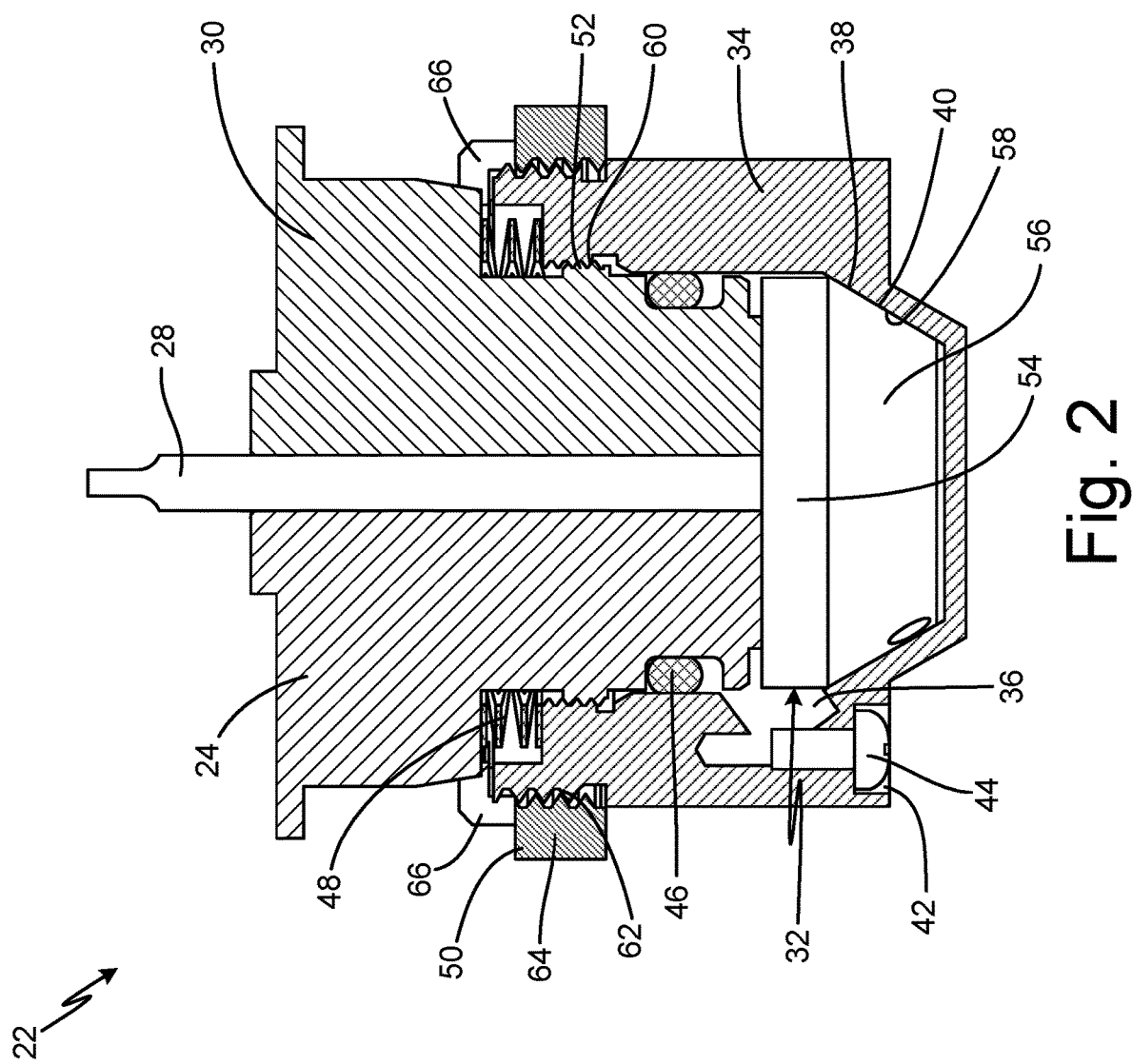
FIG. 2 is a cross-sectional view of a damper of the angle of attack sensor.

FIG. 2 is a cross-sectional view of damper assembly 22 of angle of attack sensor 10. Damper assembly 22 includes sensor 24, damper shaft 28, body 30, rotor 32, damper housing 34, chamber 36, gap 38, fill fluid 40, fill port 42, fill screw 44, seal 46, spring 48, and locking mechanism 50. Body 30 includes exterior threading 52. Rotor 32 includes cylindrical portion 54 and conical portion 56. Damper housing 34 includes tapered interior surface 58, interior housing threading 60, and exterior housing threading 62. Locking mechanism 50 includes threaded ring portion 64 and teeth 66.

A first end of damper shaft 28 is connected to vane shaft 18 (shown in FIG. 1), which is connected to vane 16 (shown in FIG. 1). Damper shaft 28 extends through body 30. In this embodiment, body 30 is a body of sensor 24. In alternate embodiments, body 30 is a housing separate from sensor 24. A second end of damper shaft 28 is connected to rotor 32. Rotor 32 may be affixed to damper shaft 28 or may be integral to damper shaft 28. Rotation of rotor 32 is coupled with rotation of vane 16. A portion of body 30 and rotor 32 are positioned in damper housing 34. Damper housing 34 is connected to body 30 to form chamber 36 between body 30 and damper housing 34. Chamber 36 is a cavity in damper assembly 22. Rotor 32 is located within chamber 36. Damper housing 34 and rotor 32 also form gap 38, which is part of chamber 36, between rotor 32 and damper housing 34. Fill fluid 40 fills, or is located within, chamber 36. As such, fill fluid 40 also fills gap 38. Fill fluid 40 is a viscous damping fluid. Fill port 42 is an opening in damper housing 34. Fill port 42 extends from an exterior surface of damper housing 34 to an interior surface of damper housing 34 at chamber 36. Fill screw 44 is positionable in fill port 42. Seal 46 is located between damper housing 34 and body 30. Spring 48 is also positioned between damper housing 34, near a first end of damper housing 34, and body 30. Spring 48 is an annular wave spring. Locking mechanism 50 is adjacent damper housing 34 and body 30. In this embodiment, locking mechanism 50 is a locking ring positioned around damper housing 34 and body 30. In alternate embodiments, locking mechanism 50 may be a locking patch, a fastener, a lock washer, staking, or any other suitable locking mechanism.

Body 30 has exterior threading 52 on an exterior surface of body 30. In this embodiment, exterior threading 52 is threading on an annular surface of body 30 between a first end and a second end of body 30. Rotor 32 has cylindrical portion 54 connected to conical portion 56. Cylindrical portion 54 is also connected to damper shaft 28. As such, a first end of cylindrical portion is connected to damper shaft 28, and a second end of cylindrical portion 54 is connected to a first end of conical portion 56. Conical portion 56 has a tapered profile, such that conical portion 56 has an angled sidewall between the first end and a second end of conical portion 56. Conical portion 56 is adjacent tapered interior surface 58 of damper housing 34. Tapered interior surface 58 is a tapered, or angled, surface of a wall of damper housing 34 near a second end of damper housing 34. Tapered interior surface 58 matches the profile of conical portion 56. As such, tapered interior surface 58 is annular and adjacent the sidewall of conical portion 56. Gap 38 is the space between the angled sidewall of conical portion 56 and the angled surface of tapered interior surface 58. Gap 38 is sized to be small enough to develop a shear gradient.

Interior housing threading 60 is threading on an interior surface of damper housing 34 near the first end of damper housing 34. Interior housing threading 60 couples, or engages, with exterior threading 52 of body 30. Spring 48 is positioned between damper housing 34 and body 30 adjacent interior housing threading 60 of damper housing 34 and threading 52 of body 30. Exterior housing threading 62 is threading on an exterior surface of damper housing 34 near the first end of damper housing 34. Exterior housing threading 62 couples, or engages, with threaded ring portion 64 of locking mechanism 50. Threaded ring portion 64 is a ring-shaped portion of a locking ring defining locking mechanism 50 with threading on an inner diameter of threaded ring portion 64. Teeth 66 extend out of a top of threaded ring portion 64 and contact spring 48 and body 30 when threaded ring portion 64 is threaded onto damper housing 34. Locking mechanism 50 may have any number of teeth 66.

Damper shaft 28 rotates as vane shaft 18 rotates along with rotation of vane 16. Rotor 32 rotates as damper shaft 28 rotates. As such, rotor 32 rotates in chamber 36 as vane 16 rotates in response to oncoming airflow. Fill fluid 40 in chamber 36 exerts a shear force on spinning rotor 32 at gap 38 to cause damping. Fill screw 44 is removable to expose fill port 42, which is used to add fill fluid 40 and evacuate entrapped air from chamber 36. Seals 46 prevent leakage of fill fluid 40 outside damper assembly 22.

Damper housing 34 can be moved, or adjusted, relative to rotor 32 to vary the width of gap 38. Damper housing 34 is adjusted axially using the threaded interface between interior housing threading 60 of damper housing 34 and exterior threading 52 of body 30. Damper housing 34 is moved axially via threading or unthreading damper housing 34 onto or from body 30 to vary the width of gap 38, which affects damping performance. For example, if vane 16 is under-damped, or vane 16 excessively overshoots the home position of 0 degrees after an impulse force or deflection is applied, damper housing 34 can be tightened, or further threaded, to body 30 to decrease the width of gap 38. As a result, damping characteristics are adjusted, causing vane 16 to overshoot 0 degrees to a lesser extent. Therefore, damper housing 34 is adjusted with respect to rotor 32 to achieve the desired width of gap 38, or the width of gap 38 that results in the desired damping characteristics.

Once the desired width of gap 38 is achieved, locking mechanism 50 is utilized. Locking mechanism 50 fixes damper housing 34 to body 30, and thus fixes damper housing 34 with respect to rotor 32, after adjustment. In this embodiment, locking mechanism 50 is a locking ring and threaded ring portion 64 of the locking ring is threaded onto exterior housing threading 62. As threaded ring portion 64 is threaded onto damper housing 34, teeth 66 are forced into engagement with spring 48 and lock onto body 30. Spring 48 biases damper housing 34 axially to one side of exterior threading 52 of body 30 for consistency, minimizing variation of gap 38, and fixes rotation of damper housing 34 with respect to body 30 while tightening, or threading, locking mechanism 50 onto damper assembly 22.

When vane 16 (shown in FIG. 1) is released after being displaced by oncoming airflow or other environmental inputs, vane 16 needs to return to near 0 degrees within a certain time (the time constant), without oscillating too much, in order for angle of attack sensor 10 to provide accurate angle of attack readings to the aircraft's flight computer. A properly functioning damper assembly 22 causes vane 16 to return to near 0 degrees within an appropriate amount of time without excessively overshooting 0 degrees, or without overshooting 0 degrees at all.

Traditionally, damper assemblies have a fixed gap between the damper housing and a cylindrical rotor. Damping precision is affected by the viscosity of the fill fluid and the width of the gap between the rotor and the damper housing. The viscosity of the fill fluid is generally fixed but can vary with temperature. The width of the gap varies due to mechanical part tolerances, such as the tolerance of the rotor and the tolerance of the damper housing. Thus, implicit variation exists in fluid viscosity and gap width that directly impacts the overall damper tolerance. As a result, a traditional damper assembly having a fixed gap has a limited ability to achieve a precise damping performance.

Damper assembly 22 allows for more control over damping performance by allowing for variation in the width of gap 38, which changes, or fine tunes, the damping performance. Width of gap 38 can be adjusted to account for implicit design characteristics in damper assembly 22, such as variation in the viscosity of fill fluid 40 and the tolerances of damper housing 34 and rotor 32. Once the desired and precise damping performance characteristics (optimal time constant and overshoot) have been achieved, gap 38 is fixed and damper assembly 22 has the optimal dynamic response. Damper assembly 22 may be customized and interchangeable, as a single set of parts is able to achieve different damping profiles. As a result, damper assembly 22 is also more cost-effective, allows for easy replacement, and increases design cycle efficiency.

Figure 3:
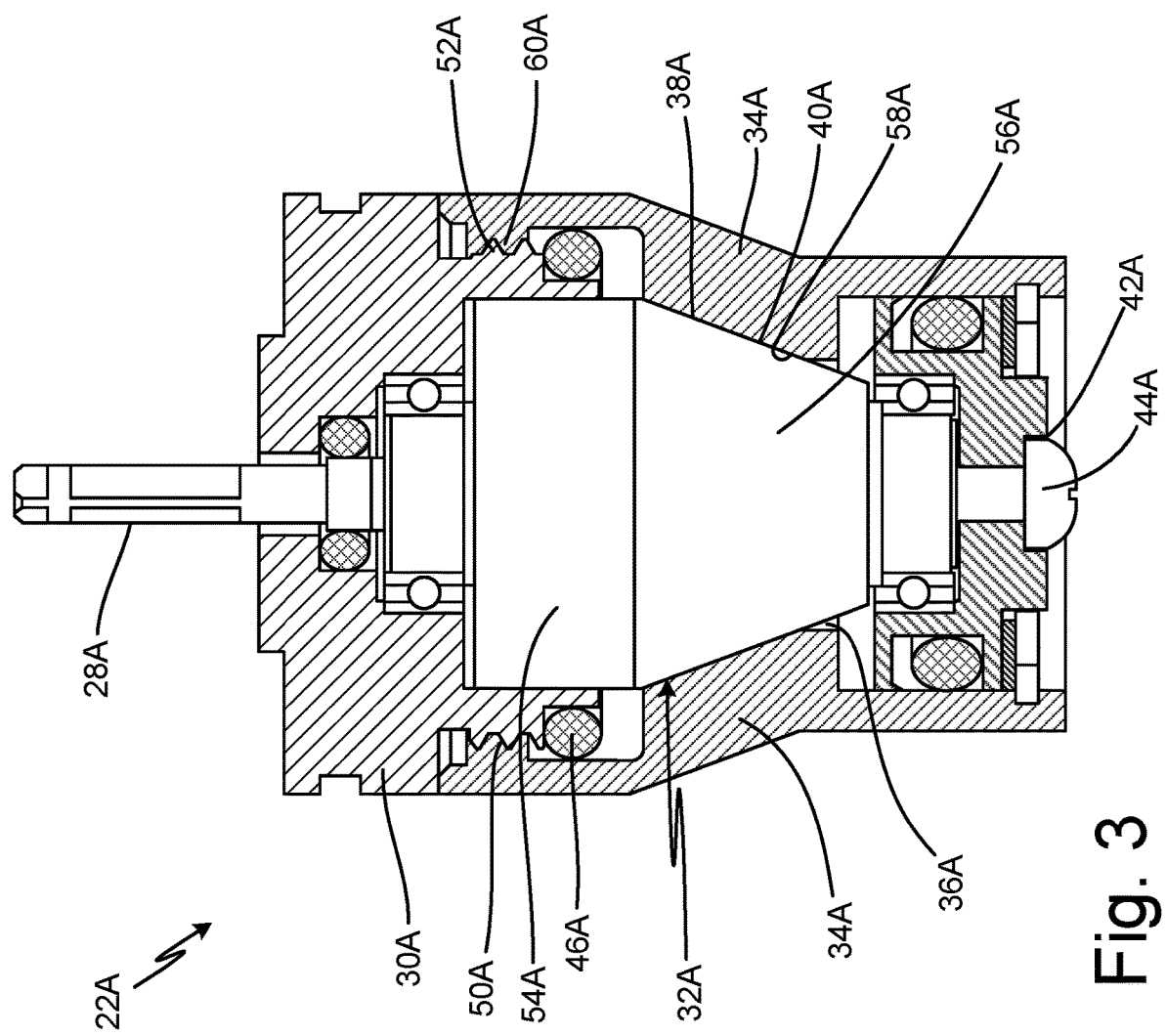
FIG. 3 is a cross-sectional view of an offset damper.

FIG. 3 is a cross-sectional view of offset damper assembly 22A. Damper assembly 22A includes damper shaft 28A, body 30A, rotor 32A, damper housing 34A, chamber 36A, gap 38A, fill fluid 40A, fill port 42A, fill screw 44A, seal 46A, and locking mechanism 50A. Body 30A includes exterior threading 52A. Rotor 32A includes cylindrical portion 54A and conical portion 56A. Damper housing 34A includes tapered interior surface 58A, interior housing threading 60A.

Damper assembly 22A is offset from, or not directly connected to, vane shaft 18 (shown in FIG. 1), or the center axis of rotation of vane 16 (shown in FIG. 1). As such, damper assembly 22A is connected to vane shaft 18 and sensor 24 by gears, pulleys, or any other suitable connection. Damper shaft 28A extends through body 30A, which is a housing separate from sensor 24 (shown in FIG. 1), and is connected to rotor 32A. Damper assembly 22A is not directly connected to sensor 24. A portion of body 30A and rotor 32A are positioned in damper housing 34A, which is connected to body 30A to form chamber 36A. Rotor 32A is located within chamber 36A. Rotor 32A rotates in chamber 36A as vane 16 rotates in response to oncoming airflow. Gap 38 is between rotor 32A and damper housing 34A. Fill fluid 40A fills chamber 36A and gap 38A exerts a shear force on spinning rotor 32A at gap 38A to cause damping. Fill port 42A is an opening in damper housing 34A used to add fill fluid 40A and evacuate entrapped air from chamber 36A, and fill screw 44A is positionable in fill port 42A. Seal 46A is located between damper housing 34A and body 30A to prevent leakage of fill fluid 40. Locking mechanism 50A is adjacent damper housing 34A and body 30A. In this embodiment, locking mechanism 50A is a locking patch, such as Loctite, positioned between exterior threading 52A of body 30A and interior housing threading 60A on an interior surface of damper housing 34A. In alternate embodiments, locking mechanism 50 may be a locking ring, a fastener, a lock washer, staking, or any other suitable locking mechanism.

Rotor 32A has cylindrical portion 54A connected to conical portion 56A. Cylindrical portion 54A is also connected to damper shaft 28A. Conical portion 56A has a tapered profile, such that conical portion 56A has an angled sidewall between the first end and a second end of conical portion 56A. Conical portion 56A is adjacent tapered interior surface 58A of damper housing 34A. Tapered interior surface 58A is a tapered, or angled, surface of a wall of damper housing 34A. Tapered interior surface 58A matches the profile of conical portion 56A. Gap 38A is the space between the angled sidewall of conical portion 56A and the angled surface of tapered interior surface 58A. Gap 38A is sized to be small enough to develop a shear gradient.

Interior housing threading 60A couples, or engages, with exterior threading 52A of body 30A. Damper housing 34A can be moved, or adjusted, relative to rotor 32 to vary the width of gap 38A. Damper housing 34A is adjusted axially using the threaded interface between interior housing threading 60A of damper housing 34A and exterior threading 52A of body 30A, such as by threading or unthreading damper housing 34A onto or from body 30A. Therefore, damper housing 34A is adjusted with respect to rotor 32A to achieve the desired width of gap 38A, or the width of gap 38A that results in the desired damping characteristics. Subsequently, locking mechanism 50 is used to fix damper housing 34A to body 30A, fixing damper housing 34A with respect to rotor 32A.

Damper assembly 22A allows for more control over damping performance by allowing for variation in the width of gap 38A, which changes, or fine tunes, the damping performance. Width of gap 38A can be adjusted to account for implicit design characteristics in damper assembly 22A, such as variation in the viscosity of fill fluid 40A and the tolerances of damper housing 34A and rotor 32A. Once the desired and precise damping performance characteristics (optimal time constant and overshoot) have been achieved, gap 38A is fixed and damper assembly 22A has the optimal dynamic response. Damper assembly 22A may be customized and interchangeable, resulting in cost-effectiveness, easier replacement, and increased design cycle efficiency. Further, because damper assembly 22A is not directly connected to a vane shaft and a sensor, damper assembly 22A is more adaptable and can be installed in a greater amount of applications.

Discussion of Possible Embodiments

The following are non-exclusive descriptions of possible embodiments of the present invention.

A damper assembly for an angle of attack sensor includes a rotor including a conical portion; a damper housing in which the rotor is positioned, the damper housing being configured to be adjusted axially with respect to the rotor and including a tapered interior surface that matches a profile of the conical portion; and a locking mechanism adjacent the damper housing.

The damper assembly of the preceding paragraph can optionally include, additionally and/or alternatively, any one or more of the following features, configurations and/or additional components:

The locking mechanism is configured to fix the damper housing with respect to the rotor.

The locking mechanism is a locking ring.

An adjustable gap between the tapered interior surface and the conical portion of the rotor.

The adjustable gap is adjusted by axially adjusting the damper housing with respect to the rotor.

The damper housing includes interior housing threading on an interior surface of the damper housing.

A spring adjacent the damper housing.

The damper assembly is connectable to a vane shaft of the angle of attack sensor.

The damper assembly is directly connectable to the vane shaft of the angle of attack sensor.

The damper assembly is indirectly connectable to the vane shaft of the angle of attack sensor.

Rotation of the rotor is coupled with rotation of a vane of the angle of attack sensor.

A damper assembly for an angle of attack sensor includes a shaft; a body surrounding the shaft and including exterior threading on an exterior surface of the body; a damper housing including: interior housing threading engageable with the exterior threading of the body; and a tapered interior surface; and a rotor connected to an end of the shaft and located between the body and the tapered interior surface of the damper housing, the rotor including a conical portion adjacent the tapered interior surface of the damper housing.

The damper assembly of the preceding paragraph can optionally include, additionally and/or alternatively, any one or more of the following features, configurations and/or additional components:

The tapered interior surface of the damper housing matches a profile of the conical portion.

An adjustable gap between the tapered interior surface and the conical portion of the rotor.

The adjustable gap is adjusted by threading or unthreading the damper housing and the body.

A locking mechanism adjacent the body and the damper housing.

The locking mechanism is a locking ring.

The locking mechanism is configured to fix the damper housing with respect to the rotor.

A spring located between the damper housing and the body.

The damper shaft is directly connectable to a vane shaft of an angle of attack sensor.

The damper assembly is indirectly connectable to a vane shaft of the angle of attack sensor.

Rotation of the rotor is coupled with rotation of a vane of the angle of attack sensor.

A method of adjusting a damper assembly of an angle of attack sensor includes moving a damper housing axially with respect to a rotor to adjust a width of a gap between the damper housing and the rotor of a damper assembly; and fixing the damper housing with respect to the rotor using a locking mechanism.

The method of the preceding paragraph can optionally include, additionally and/or alternatively, any one or more of the following features, configurations and/or additional components:

Moving the damper housing axially to adjust a width of the gap between the damper housing and a rotor of the damper assembly includes threading or unthreading the damper housing from a body adjacent the damper housing.

Fixing the damper housing with respect to the rotor includes threading a locking ring onto the damper housing.

The gap is formed between a conical portion of the rotor and a tapered interior surface of the damper housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A damper assembly for an angle of attack sensor, the damper assembly comprising:
a rotor including a conical portion;
a damper housing in which the rotor is positioned, the damper housing being configured to be adjusted axially with respect to the rotor and including a tapered interior surface that matches a profile of the conical portion and interior housing threading on an interior surface of the damper housing;
a body having a portion positioned in the damper housing, the body connected to the damper housing to form a chamber between the body and the damper housing, wherein the rotor is located within the chamber, and wherein the body includes exterior threading engageable with the interior housing threading of the damper housing; and
a locking mechanism adjacent the damper housing.

2. The damper assembly of claim 1, wherein the locking mechanism is configured to fix the damper housing with respect to the rotor.

3. The damper assembly of claim 1, wherein the locking mechanism is a locking ring.

4. The damper assembly of claim 1, further including an adjustable gap between the tapered interior surface and the conical portion of the rotor.

5. The damper assembly of claim 4, wherein the adjustable gap is adjusted by axially adjusting the damper housing with respect to the rotor.

6. A damper assembly for an angle of attack sensor, the damper assembly comprising:
a rotor including a conical portion;
a damper housing in which the rotor is positioned, the damper housing being configured to be adjusted axially with respect to the rotor and including a tapered interior surface that matches a profile of the conical portion;
a locking mechanism adjacent the damper housing; and
a spring positioned between the damper housing and a body adjacent the damper housing to contact the damper housing and bias the damper housing axially to contact the body.

7. A damper assembly for an angle of attack sensor, the damper assembly comprising:
a shaft;
a body surrounding the shaft and including exterior threading on an exterior surface of the body;
a damper housing including:
interior housing threading engageable with the exterior threading of the body; and
a tapered interior surface; and
a rotor connected to an end of the shaft and located between the body and the tapered interior surface of the damper housing, the rotor including a conical portion adjacent the tapered interior surface of the damper housing.

8. The damper assembly of claim 7, wherein the tapered interior surface of the damper housing matches a profile of the conical portion.

9. The damper assembly of claim 7, further including an adjustable gap between the tapered interior surface and the conical portion of the rotor.

10. The damper assembly of claim 7, wherein the adjustable gap is adjusted by threading or unthreading the damper housing and the body.

11. The damper assembly of claim 7, further including a locking mechanism adjacent the body and the damper housing.

12. The damper assembly of claim 11, wherein the locking mechanism is a locking ring.

13. The damper assembly of claim 11, wherein the locking mechanism is configured to fix the damper housing with respect to the rotor.

14. The damper assembly of claim 7, further including a spring located between the damper housing and the body.

15. The damper assembly of claim 7, wherein the damper shaft is directly connectable to a vane shaft of the angle of attack sensor.

16. A method of adjusting a damper assembly of an angle of attack sensor, the method comprising:
    moving a damper housing axially with respect to a rotor to adjust a width of a gap between the damper housing and the rotor of the damper assembly, wherein moving the damper housing axially to adjust a width of the gap between the damper housing and a rotor of the damper assembly includes threading or unthreading the damper housing from a body adjacent the damper housing; and
    fixing the damper housing with respect to the rotor using a locking mechanism adjacent the damper housing.

17. The method of claim 16, wherein fixing the damper housing with respect to the rotor includes threading a locking ring onto the damper housing.

18. The method of claim 16, wherein the gap is formed between a conical portion of the rotor and a tapered interior surface of the damper housing.

* * * * *